US011847220B2

(12) United States Patent
Tripathi et al.

(10) Patent No.: US 11,847,220 B2
(45) Date of Patent: Dec. 19, 2023

(54) SCANNING OF PARTIAL DOWNLOADS

(71) Applicant: McAfee, LLC, San Jose, CA (US)

(72) Inventors: Abhishek Tripathi, Bangalore (IN);
Mayur Arvind Bhole, Pune (IN);
Nithya Nadig Shikarpur, Bangalore (IN); Tirumaleswar Reddy Konda, Bangalore (IN); Mayank Bhatnagar, Bangalore (IN)

(73) Assignee: McAfee, LLC, San Jose, CA (US)

( * ) Notice: Subject to any disclaimer, the term of this patent is extended or adjusted under 35 U.S.C. 154(b) by 205 days.

(21) Appl. No.: 17/168,934

(22) Filed: Feb. 5, 2021

(65) Prior Publication Data

US 2022/0253527 A1     Aug. 11, 2022

(51) Int. Cl.
| G06F 21/56 | (2013.01) |
| G06F 16/28 | (2019.01) |
| G06F 21/57 | (2013.01) |
| G06F 21/54 | (2013.01) |
| G06N 3/08 | (2023.01) |
| H04L 29/06 | (2006.01) |
| H04L 65/402 | (2022.01) |

(52) U.S. Cl.
CPC ......... *G06F 21/565* (2013.01); *G06F 16/285* (2019.01); *G06F 21/54* (2013.01); *G06F 21/577* (2013.01); *G06N 3/08* (2013.01); *H04L 65/4025* (2022.05); *G06F 2221/034* (2013.01)

(58) Field of Classification Search
CPC ...... G06F 21/565; G06F 16/285; G06F 21/54; G06F 21/577; G06F 2221/034; G06F 21/56; G06F 16/28; G06F 21/57; G06N 3/08; H04L 65/4025; H04L 29/06
See application file for complete search history.

(56) References Cited

U.S. PATENT DOCUMENTS

| 7,111,167 B1 * | 9/2006 | Yeung | H04L 9/3271 |
| | | | 713/181 |
| 9,124,472 B1 * | 9/2015 | Schneider | H04L 69/329 |
| 2011/0169924 A1 * | 7/2011 | Haisty | H04N 9/3147 |
| | | | 348/51 |
| 2016/0099963 A1 * | 4/2016 | Mahaffey | G06F 21/554 |
| | | | 726/25 |
| 2019/0028413 A1 * | 1/2019 | Lewis | G06F 16/00 |
| 2019/0327510 A1 * | 10/2019 | Kalagi | H04N 21/44209 |
| 2021/0166434 A1 * | 6/2021 | Miyauchi | H04N 19/124 |
| 2021/0194900 A1 * | 6/2021 | Schmidtler | H04L 63/1416 |
| 2022/0245801 A1 * | 8/2022 | Gietzen | G06K 9/6256 |

* cited by examiner

*Primary Examiner* — Quazi Farooqui
(74) *Attorney, Agent, or Firm* — Patent Capital Group

(57) ABSTRACT

There is disclosed in one example a hardware computing platform, including: a processor; a memory; a network interface; and a security module, including instructions to cause the processor to: receive a request to download a file via the network interface; download a first portion of the file into a buffer of the memory; analyze the first portion for malware characteristics; assign a security classification to the file according to the analysis of the first portion; and act on the security classification.

19 Claims, 16 Drawing Sheets

SCANNING OF PARTIAL DOWNLOADS

FIELD OF THE SPECIFICATION

This application relates in general to computer security, and more particularly, though not exclusively, to providing a system and method for scanning of partial downloads.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
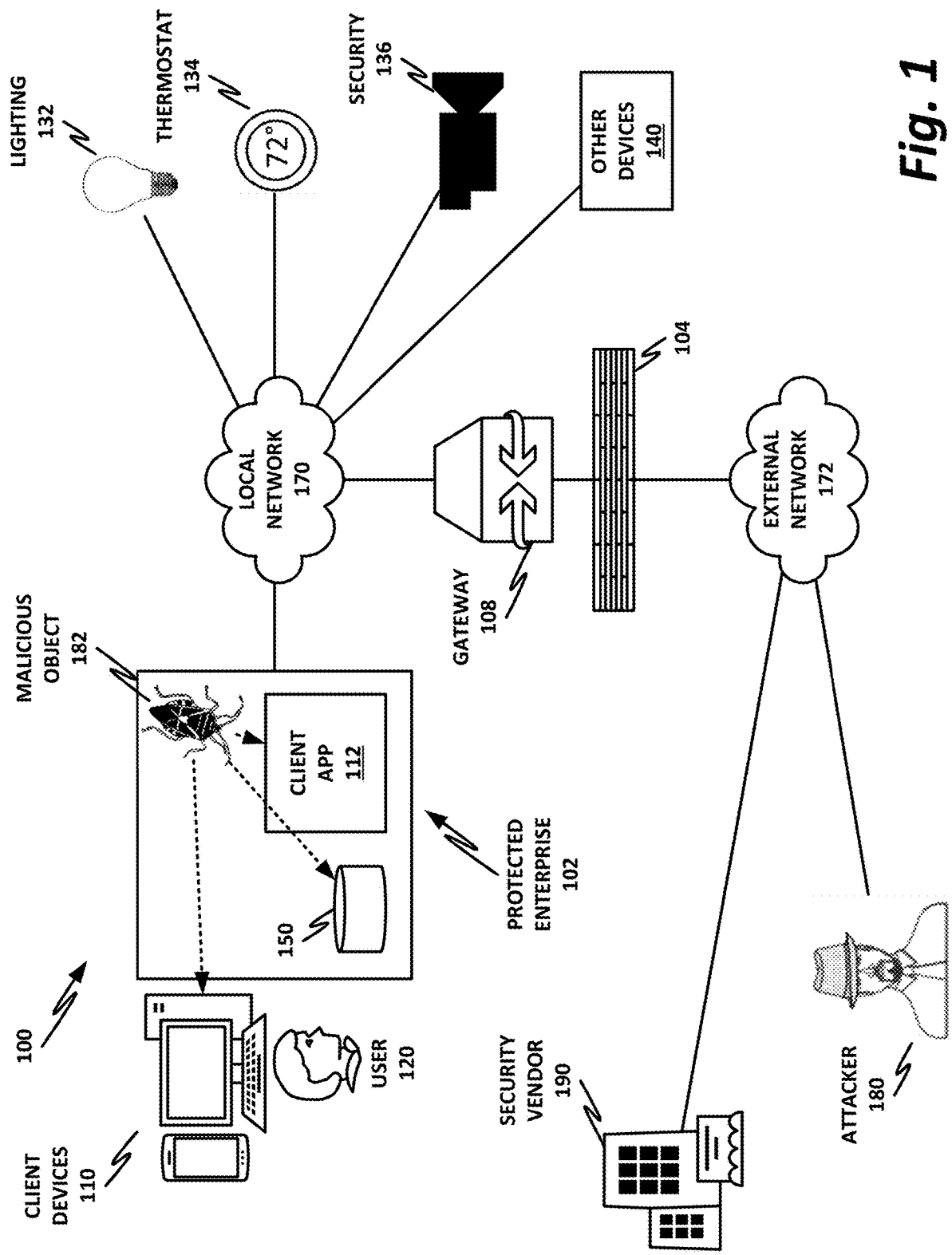
FIG. 1 is a block diagram of selected elements of a security ecosystem.

In an example, there is disclosed a hardware computing platform, comprising: a processor; a memory; a network interface; and a security module, comprising instructions to cause the processor to: receive a request to download a file via the network interface; download a first portion of the file into a buffer of the memory; analyze the first portion for malware characteristics; assign a security classification to the file according to the analysis of the first portion; and act on the security classification.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Machine learning (ML) has proved in recent years to be a powerful tool for malware detection. ML-based malware detection may in some cases use a combination of features based on, for example, static analysis (such as checksums/hash comparisons, signature matching with earlier fingerprints, and analyzing code and/or code flows) and dynamic analysis (e.g., executing the sample in a virtualized, safe, and similar environment to expected vulnerable conditions). This can be used to try to understand the behavioral aspects of a potentially malicious sample.

Typically, these approaches require a complete download of the file to disassemble and/or execute before analysis. Furthermore, it is sometimes cumbersome to create features based on static and dynamic analysis of the file. However, recent research has included the use of detecting malware files based on an image generated from the file binary. In these cases, the file is converted to a binary, such as a grayscale image, of known dimensions. A computer vision system that has been previously trained on samples of known malicious and known benign files then processes these images to determine whether they look—to the computer vision system—like malicious files.

One advantage of image-based malware identification is that it does not require execution and/or disassembling of a file. It can also be performed in a feature-agnostic fashion. However, computer vision-based malware detection still requires downloading the complete file before it can be identified as malware or benign. Downloading and/or executing complete files before being able to detect malware has challenges. First, a system that detects malware after the file has already been installed or executed requires a host security agent to perform a cleanup and remediation. Second, the time to identify malicious files may be a crucial factor in an enterprise network or environment when dealing with a large number of files. For example, analysis of downloaded files may be performed on an enterprise gateway. When a large number of new files are encountered, downloading, sandboxing, analyzing, and otherwise processing these files can be very costly in terms of time and compute resources.

The present specification describes an ML system that uses some known ML techniques, but that does not require full download of a file. This system can predict a potential malicious file during the download process. Furthermore, the download process can be paused so that the file can be analyzed, and it can then be characterized before the complete file even enters the network or enterprise environment. If the file is found to be malicious, then the remainder of the download can be rejected and never finished. In this manner, a full, usable portion of the malicious file never even makes it to the enterprise network. Embodiments of the present specification use a novel deep learning approach to predict a potential malicious file using an incomplete download binary.

A malware detection module or engine may typically check files after the download is complete. This check may include checking for certain characteristics such as known exploit code, file repetition, and signatures or patterns. A malware detection module can also extract features from the downloaded file to trigger ML techniques to identify the malware type that the file contains. An anti-malware engine can perform behavioral or heuristic analysis to identify malicious actions by monitoring file execution behavior. These activities can be used to augment the teachings of the present specification, and in particular, in cases where a file has a marginal or borderline reputation, where it is difficult to make a high confidence prediction whether the file is malicious or benign. As described above, these techniques typically require the complete file to be downloaded by the endpoint or the web gateway to trigger analysis of the file.

An ML engine of the present specification can be used to identify malicious files even before the download is complete. This can save resources on the endpoint and/or the gateway, and can help to prevent malicious files from ever reaching the endpoint or gateway in their final operational forms. Furthermore, this can significantly reduce the costs incurred with system cleanup and remediation, because the file is never given a chance to execute and/or deploy on the target system. For example, if the file is classified as malware before the download is complete, the sandboxing technique may not be necessary. Because the file is already known or believed to be malicious, it can be rejected at the enterprise gateway, or at the endpoint before it ever arrives. This can save time, because file analysis typically takes minutes, but can run even longer. This reduces the performance challenges of hosting isolated virtual environments. The teachings of the present specification may be used by host and network security services such as a virus scan system and/or a web gateway. They can also be used by enterprise and consumer segment security products to detect and block file-based threats.

The present specification provides a system and method that can detect malware while a file is being downloaded using an image created by the partially downloaded binary. Deep learning model training may use images created with partial as well as full binary files. Partial images can be used with or without replacement. The system also provides prioritization of file downloading in terms of bandwidth and time in an enterprise network, based on the output of an ML model.

The output of an image-based detection may be used to complement or replace existing malware identification models, as appropriate. The system also provides for the prediction of potential malware files during different levels of downloading. For example, a file may be analyzed at any one of 75, 85, and/or 95% downloaded. The download can then be checked with an ML model. The checks at these different percentages may be independent, or they may be cumulative. For example, the system could check at 75, or 85, or 95%, or it could check at 75, and 85, and 95%. These results can then be correlated to check whether predictions are consistent at different download levels. If predictions are consistent at different download levels, this increases the confidence that the prediction overall is correct.

Advantageously, a computer vision-based ML system can operate very quickly, and depending on the image and its complexity, may take only seconds or even a fraction of a second to characterize. This can be as opposed to more complex systems that require complicated dynamic and static analysis, which can take on the order of minutes per each file. Thus, the ability to arrive at a high confidence prediction in a very short time is increased, for example, by analyzing the file at different points in the download.

The method described herein realizes advantages over some existing systems. For example, some existing malware detection products may carry out analysis and detection via static analysis, dynamic analysis, and combinations thereof. Static analysis techniques may include, for example, checksum/hash comparisons, signature matching with earlier fingerprints, disassembling the code, exploring the code flow to look for malicious patterns, and similar.

Static analysis is sometimes slow, and may be hampered by obfuscated, non-human-readable and non-understandable code. Malware authors may use new obfuscation and decoy techniques to try to defeat existing static analysis. Dynamic techniques may include executing the sample in an automated virtualized system (sandbox) to try to observe behavioral aspects of the possibly malicious sample. Dynamic analysis can be time-consuming, and often the sample does not execute as the detection system intends. Some more sophisticated modern systems may be developed to understand virtualized environments, and to detect when they are being sandboxed. Those samples may not execute the malicious part of their code during the sandboxing, and thus they will appear benign. This makes it difficult to determine the malicious code paths that exist in the sample, but that are hidden during dynamic analysis.

In a case where it is desirable to identify malicious code as quickly and accurately as possible, these existing dynamic and static analysis techniques have some limitations.

Security product vendors such as, for example, MCAFEE, LLC also use automated malware analysis systems. These systems may be configured to analyze and categorize samples that are received and collected. They may then provide accurate and updated databases of sample signatures. Third parties can then, for example, subscribe to antivirus services, and endpoint engines can receive these updates. In other examples, various in-house malware analysis and detection products may be used. There are also automated sandbox-based detection systems. These are run in an automated virtualized environment, and malicious behavior can be detected.

While security services providers have made substantial strides in defeating the workarounds that malware authors find, at least some of these existing products require a complete file or sample. The file or sample may be shared with the system, or may be otherwise accessible, but in general, it is completely downloaded. Any missed bytes not downloaded, or any file not completely transferred or shared, can lead to even a well-written algorithm or technique failing and not being able to analyze the sample.

Because security product vendors often have to deal with thousands or millions of samples for analysis, time and accuracy become premium considerations. Thus, it is advantageous to provide a system where samples can be analyzed with a partial file download.

The use of images extracted from file binaries to classify malware has previously been demonstrated. For example, a convolutional neural network (CNN)-based lightweight classification system may be used to detect distributed denial of service (DDoS) malware in an internet of things (IoT) environment, or other species of malware. It has also been demonstrated that deep learning can be used to improve image-based classification of malware. However, as described above, these existing demonstrations rely on fully downloaded binaries. Thus, these techniques can be improved and/or augmented with the use of partially downloaded binaries. For example, partial images may be augmented to a full image dataset to aid in generalization for the deep learning model.

Data augmentation is a type of regularization that may be used to reduce overfitting by increasing variability in the data by adding more training data. Data augmentation has been demonstrated to be effective for image classification. Sample techniques such as cropping and flipping input images are effective augmentation techniques. In the present specification, images generated from partially downloaded binaries may use data augmentation to train a model that can be effective in predicting images generated both from completely downloaded and from partially downloaded binaries. In some embodiments, the model is optimized to be effective for partially downloaded images. However, the disclosed augmentation method can also be used along with any other existing data augmentation techniques.

A typical file download occurs in one of two ways:
1. Sequentially.
2. Randomly, as in from torrent sites.

In sequential downloads, the binaries are downloaded in a sequence from start to end. In random downloading, the binaries are downloaded in chunks randomly from different parts of the file. The method disclosed herein can be applied to partial binaries downloaded from either method. To clarify and simplify the disclosure, the examples provided herein are for a sequentially downloaded file. However, the disclosure is also applicable to a file downloaded in random pieces.

In this case, the partially downloaded file will have missing data not at the end of the file, but interstitially within the file.

The present specification generates partial images from partially downloaded binaries, at a percentage such as 80% or 90%, by way of nonlimiting example. This can be used along with images from completely downloaded binaries, with or without replacement to train the deep learning model. The model trained with the data augmentation robustly predicts image-based malware from partial download binaries.

Empirically, the method disclosed herein has been found in experimental data sets to accurately and quickly predict malware. For example, in one experiment, data were collected to train the models. The data set was split into training, validation, and test sets, as per standard techniques. The training data included some partial binaries. The ML model was trained with both partial and full downloads. In the training set, which included both full and partial binaries, the method was found to accurately and quickly predict malware at a rate at least as good as with existing techniques.

The foregoing can be used to build or embody several example implementations, according to the teachings of the present specification. Some example implementations are included here as nonlimiting illustrations of these teachings.

Several illustrative embodiments are disclosed below.

There is disclosed an example of a hardware computing platform, comprising: a processor; a memory; a network interface; and a security module, comprising instructions to cause the processor to: receive a request to download a file via the network interface; download a first portion of the file into a buffer of the memory; analyze the first portion for malware characteristics; assign a security classification to the file according to the analysis of the first portion; and act on the security classification.

There is further disclosed an example hardware computing platform, further comprising a network stack, wherein the instructions are to hook a layer of the network stack.

There is further disclosed an example hardware computing platform, wherein the layer is layer 3.

There is further disclosed an example hardware computing platform, further comprising a network stack, wherein the instructions are further to provide a shim application, and to insert the shim application into the network stack.

There is further disclosed an example hardware computing platform, wherein acting on the security classification comprises completing the download only if the security classification is above a threshold.

There is further disclosed an example hardware computing platform, wherein acting on the security classification comprises deleting the file if the classification is below a threshold.

There is further disclosed an example hardware computing platform, wherein the instructions are further to download a second portion of the file and analyze the second portion of the file, wherein assigning the security classification comprises comparing the first analysis to the second analysis.

There is further disclosed an example hardware computing platform, wherein the instructions are further to download a third portion of the file and analyze the third portion, wherein assigning the security classification comprises comparing the third analysis to the first and second analyses.

There is further disclosed an example hardware computing platform, wherein the first portion of the file is between 70% and 90% of the file.

There is further disclosed an example hardware computing platform, wherein the instructions are further to provision a machine learning engine, and wherein analyzing the first portion comprises operating the machine learning engine.

There is further disclosed an example hardware computing platform, wherein the machine learning engine comprises a neural network.

There is further disclosed an example hardware computing platform, wherein the neural network is configured and trained for computer vision analysis.

There is further disclosed an example hardware computing platform, wherein the neural network is trained on partial downloads.

There is further disclosed an example hardware computing platform, wherein the instructions are further to featurize the first portion before analyzing.

There is further disclosed an example hardware computing platform, wherein featurizing comprises converting the first portion to an image.

There is further disclosed an example hardware computing platform, wherein converting the first portion to an image comprises lossy compression.

There is further disclosed an example hardware computing platform, wherein converting the first portion to an image comprises zero-padding the first portion to a square.

There is further disclosed an example endpoint device comprising the hardware computing platform of a number of the above examples.

There is further disclosed an example internet of things (IoT) device comprising the hardware computing platform of a number of the above examples.

There is further disclosed an example smart phone comprising the hardware computing platform of a number of the above examples.

There is further disclosed an example tablet computer comprising the hardware computing platform of a number of the above examples.

There is further disclosed an example network gateway device comprising the hardware computing platform of a number of the above examples.

There is also disclosed an example of one or more tangible, non-transitory computer-readable media having stored thereon executable instructions to: partially download a file from an entrusted source; featurize the partially downloaded file; analyze the features for malware characteristics; and according to the analysis of the features for malware characteristics, take a security action on the partially downloaded file.

There is further disclosed an example of one or more tangible, non-transitory computer-readable media, wherein the instructions are further to hook a layer of a network stack.

There is further disclosed an example of one or more tangible, non-transitory computer-readable media, wherein the layer is layer 3.

There is further disclosed an example of one or more tangible, non-transitory computer-readable media, wherein the instructions are further to provide a shim application, and to insert the shim application into a network stack.

There is further disclosed an example of one or more tangible, non-transitory computer-readable media, wherein taking the security action comprises completing the download only if the analysis detects malware characteristics below a threshold.

There is further disclosed an example of one or more tangible, non-transitory computer-readable media, wherein taking the security action comprises deleting the file if the analysis detects malware characteristics above a threshold.

There is further disclosed an example of one or more tangible, non-transitory computer-readable media, wherein the instructions are further to download a second portion of the file and analyze the second portion of the file, wherein the analysis further comprises comparing the partially downloaded file with the second portion of the file.

There is further disclosed an example of one or more tangible, non-transitory computer-readable media, wherein the instructions are further to download a third portion of the file and analyze the third portion, wherein the analysis further comprises comparing the partially downloaded file with the second portion of the file and the third portion of the file.

There is further disclosed an example of one or more tangible, non-transitory computer-readable media, wherein the partially downloaded file is between 70% and 90% of the file.

There is further disclosed an example of one or more tangible, non-transitory computer-readable media, wherein the instructions are further to provision a machine learning engine, and wherein the analysis further comprises operating the machine learning engine.

There is further disclosed an example of one or more tangible, non-transitory computer-readable media, wherein the machine learning engine comprises a neural network.

There is further disclosed an example of one or more tangible, non-transitory computer-readable media, wherein the neural network is configured and trained for computer vision analysis.

There is further disclosed an example of one or more tangible, non-transitory computer-readable media, wherein the neural network is trained on partial downloads.

There is further disclosed an example of one or more tangible, non-transitory computer-readable media, wherein featurizing the partially downloaded file comprises converting the partially downloaded file to an image.

There is further disclosed an example of one or more tangible, non-transitory computer-readable media, wherein converting the partially downloaded file to an image comprises lossy compression.

There is further disclosed an example of one or more tangible, non-transitory computer-readable media, wherein converting the partially downloaded file to an image comprises zero-padding the partially downloaded file.

There is also disclosed an example method of analyzing file downloads, comprising: training a computer vision system on a combination of complete and partial downloads; downloading a first part of a file up to a first threshold; operating the computer vision system to analyze the first part; according to the analysis of the first part, assigning the file a first partial reputation; and acting on the first partial reputation.

There is further disclosed an example method, further comprising hooking a layer of a network stack.

There is further disclosed an example method, wherein the layer is layer 3.

There is further disclosed an example method, further comprising inserting a shim application into a network stack.

There is further disclosed an example method, wherein acting on the first partial reputation comprises completing the download only if the first partial reputation is above a threshold.

There is further disclosed an example method, wherein acting on the first partial reputation comprises deleting the file if the first partial reputation is below a threshold.

There is further disclosed an example method, further comprising downloading a second part of the file and analyzing the second part of the file, wherein assigning the first partial reputation comprises comparing the first analysis to the second analysis.

There is further disclosed an example method, further comprising downloading a third part of the file and analyzing the third part of the file, wherein assigning the first partial reputation comprises comparing the third analysis to the first and second analyses.

There is further disclosed an example method, wherein the first part of the file is between 70% and 90% of the file.

There is further disclosed an example method, further comprising provisioning a machine learning engine, and wherein analyzing the first part comprises operating the machine learning engine.

There is further disclosed an example method, wherein the machine learning engine comprises a neural network.

There is further disclosed an example method, wherein the neural network is trained on partial downloads.

There is further disclosed an example method, further comprising featurizing the first part before analyzing.

There is further disclosed an example method, wherein featurizing comprises converting the first part to an image.

There is further disclosed an example method, wherein converting the first part to an image comprises lossy compression.

There is further disclosed an example method, wherein converting the first part to an image comprises zero-padding the first part.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an apparatus of a number of the above examples, wherein the apparatus is a computing system.

There is further disclosed an example of at least one computer-readable medium comprising instructions that, when executed, implement a method or realize an apparatus as illustrated in a number of the above examples.

A system and method for providing scanning of partial downloads will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be adapted to use the partial download scan technique disclosed in the present specification. This can improve the security of protected enterprise 102, as illustrated.

In the example of FIG. 1, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security vendor 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a stand-alone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security vendor 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security vendor 190, which may provide security services, updates, antivirus definitions, patches, products, and services. MCAFEE, LLC is a nonlimiting example of such a security services provider that offers comprehensive security and antivirus solutions. In some cases, security vendor 190 may include a threat intelligence capability such as the global threat intelligence (GTI™) database provided by MCAFEE, LLC, or similar competing products. Security vendor 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
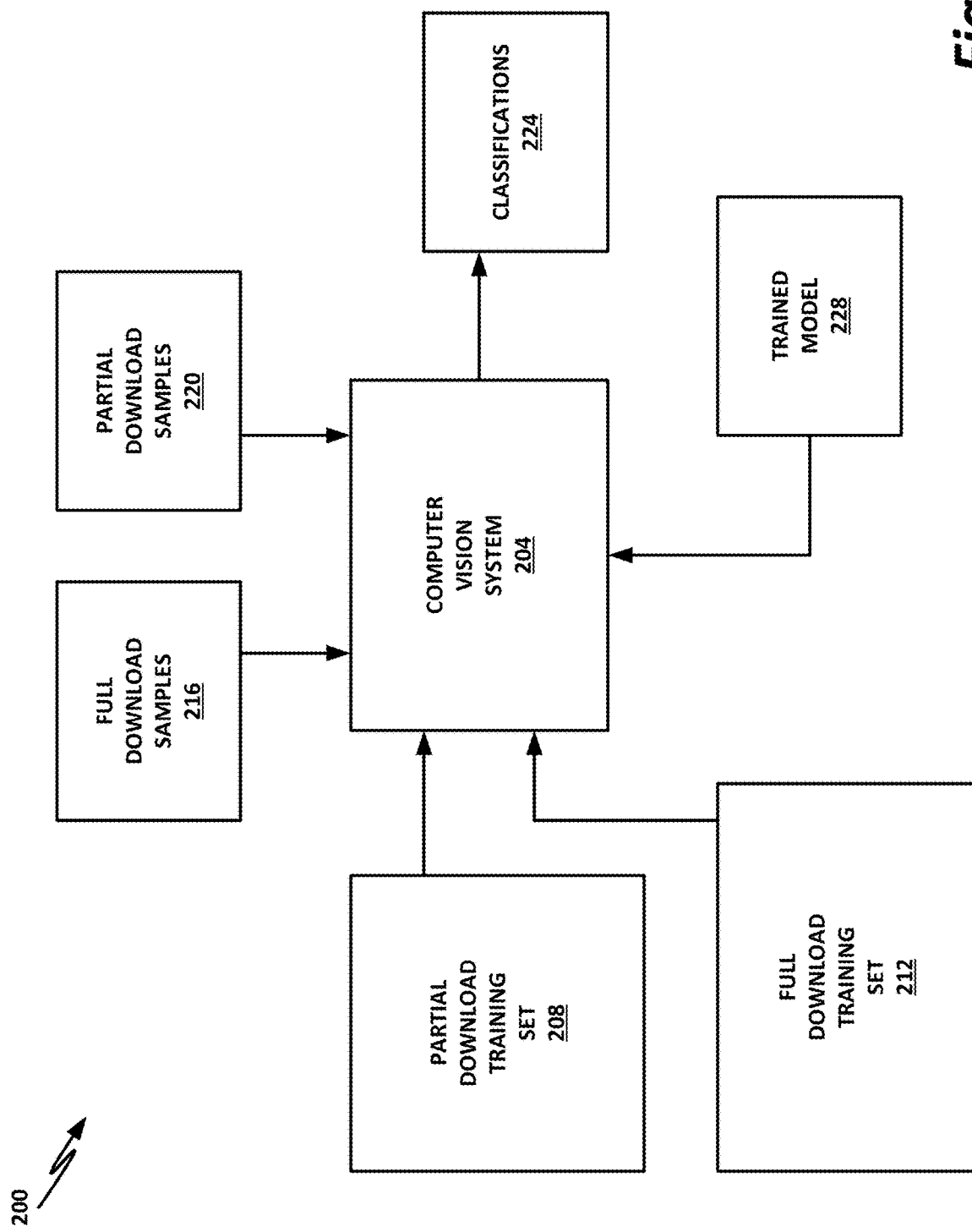
FIG. 2 is a block diagram of a sample analysis system.

FIG. 2 is a block diagram of a sample analysis system 200. Sample analysis system 200 is configured to provide classifications of objects based on both full and partial download samples.

Sample analysis system 200 includes a computer vision system 204. Computer vision system 204 may include, for example, a machine learning engine, such as a neural network, and specifically a CNN. Computer vision system 204 may include logic to analyze unknown samples, and to determine whether they are apparently malicious.

Computer vision system 204 receives as inputs a partial download training set 208, and a full download training set 212. These two data sets are used to train the neural network, such as by converting binaries into grayscale images of a given size, and then allowing the computer vision system to process the grayscale images to determine whether they appear to have the features of malware.

In some cases, computer vision system 204 may be deployed on an endpoint or a consumer class system. In those cases, it may be less practical for the model to be trained on the endpoint device. For example, a consumer endpoint device may not have a large array of graphics processing units (GPUs), which are useful in training large data sets. In those cases, computer vision system 204 may be provided with a trained model 228, which includes pre-trained parameters for computer vision system 204. In that case, the kernels within each layer of the computer vision system may have already had appropriate weights assigned to them, based on the original training data.

Computer vision system 204 receives input samples, which may include unknown samples that are to be classified as either malicious or benign. These can include both full download samples 216 and partial download samples 220. Computer vision system 204 receives these samples, and then outputs classifications 224. These classifications may indicate whether computer vision system 204 has determined that a sample is either benign or malicious. This could also include a confidence for the determination.

Figure 3:
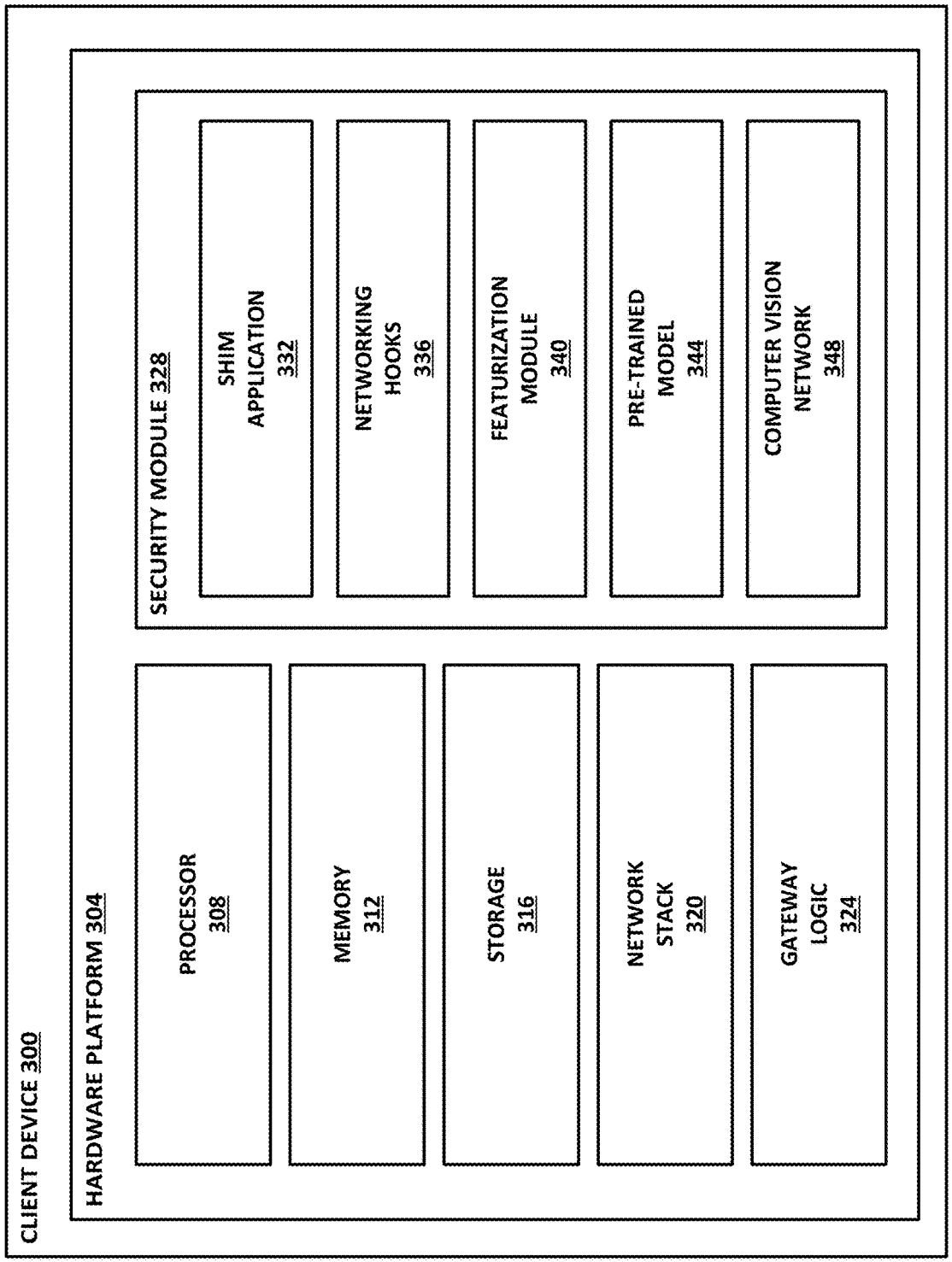
FIG. 3 is a block diagram of a client device.

FIG. 3 is a block diagram of a client device 300. Client device 300 is based on a hardware platform 304, and provides a security module 328.

Client device 300 may be configured to classify incoming unknown samples, including by analyzing samples at a partial download, such as at 75%, 80%, 85%, 90%, or 95%, by way of illustrative and nonlimiting example.

Figure 11:
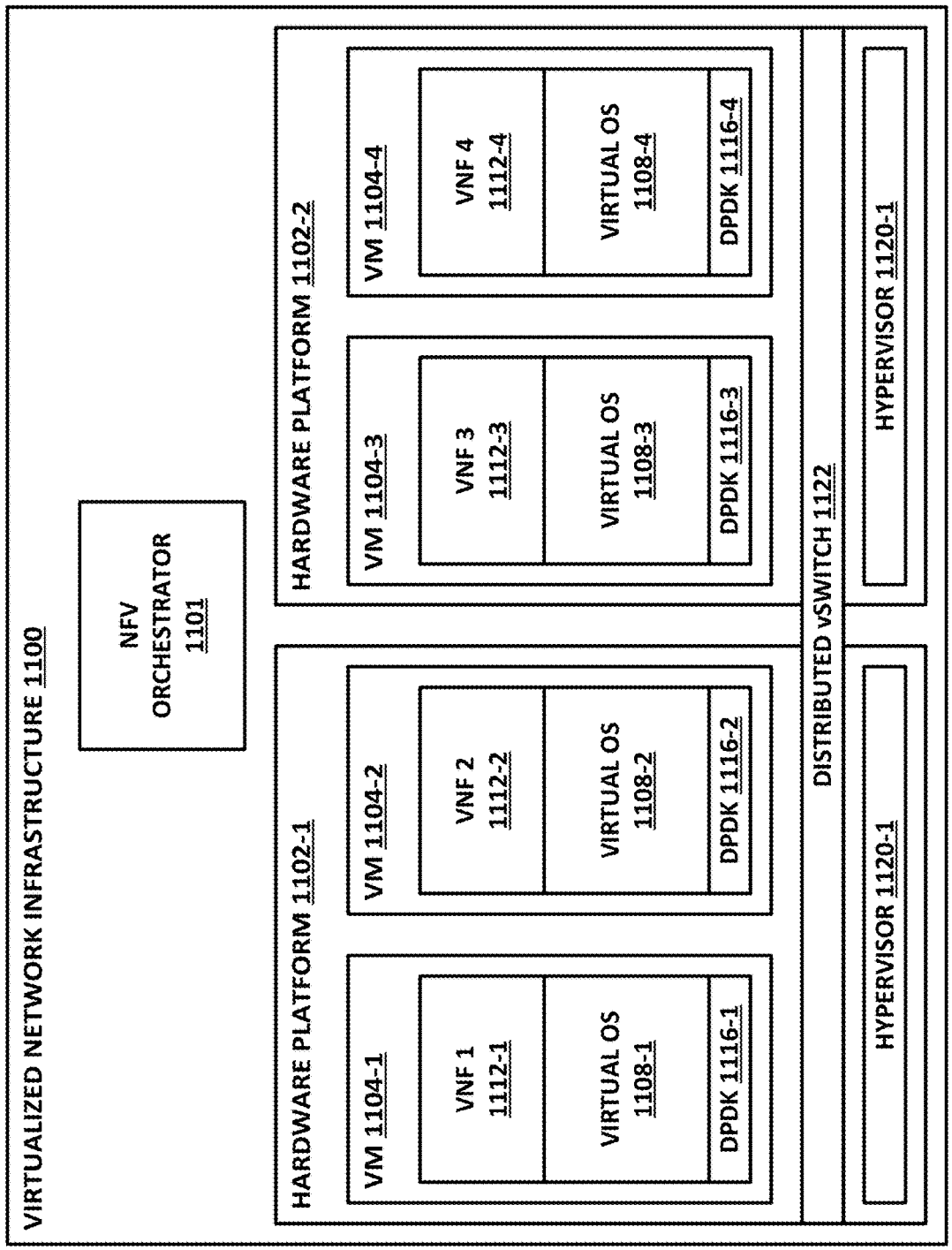
FIG. 11 is a block diagram of selected elements of a network function virtualization (NFV) infrastructure.

Client device 300 includes a hardware platform 304, which includes a processor 308 and a memory 312. Processor 308 may be a physical central processor unit (CPU), a GPU, or any other appropriate processor. It should also be noted that in some cases, processor 308 could be virtualized, such as in the case of a virtualized network infrastructure as illustrated in FIG. 11.

Memory 312 may include both volatile and nonvolatile memory, as appropriate to the embodiment. In some cases, memory 312 is logically separate from storage 316. In those cases, memory 312 is generally considered to be faster than storage 316. However, the term "memory" should be broadly understood to encompass both fast volatile memory and slower nonvolatile memory, as appropriate to various embodiments.

Hardware platform 304 also provides a network stack 320, which may include both physical and/or logical network interfaces. Network stack 320 may include hardware, firmware, and/or software to provide network communications. This could provide, for example, a traditional seven-layer stack, such as a seven-layer TCP/IP stack, an alternative stack such as a seven-layer Open Systems Interconnection (OSI) stack, or any other appropriate network stack.

In this example, client device 300 also includes gateway logic 324. Gateway logic 324 is provided in the case that client device 300 acts as a home or enterprise gateway to a network. In those cases, client device 300 may analyze downloads as they come into the device. Thus, if client device 300 classifies an object as malicious, that object may not ever reach its intended target device, but can be stopped before it is even transferred. Locating security module 328 on a gateway has various advantages, such as by providing a single policy for the entire network, and it may protect devices such as IoT devices, which may have limited onboard security capabilities. However, a security module 328 could also be provided on an endpoint device that is a consumer grade device, if the device has sufficient compute resources. For example, laptops, desktops, smart phones, and/or tablets may have sufficient computing resources to provide their own onboard security modules.

Security module 328 includes a shim application 332 and networking hooks 336, which may insert themselves into network stack 320, and which may intercept or process certain network communications, and in particular, incoming data such as downloads.

Featurization module 340 may include logic to featurize an object, which in this case could include, for example, augmenting training data as necessary, compressing the binary into an appropriate array size if necessary, and converting the object into an 8-bit or other grayscale bitmap image. In one illustrative example, incoming binaries are compressed, as necessary, into a 229×229-pixel grayscale image that can then be analyzed by the neural network. By way of further nonlimiting example, training datasets containing images of full binaries may also be augmented with images of partially downloaded binaries.

If other machine learning classifiers are being used, then featurization module 340 may extract other features from the binary and use those for analysis of the binary by the neural network. In this illustration, security module 328 includes a pre-trained model 344, which provides the appropriate weights and biases for the neural network. In other cases, security module 328 may be trained onboard the device.

Computer vision network 348 is a machine learning engine, such as a CNN, that is able to process the featurized unknown binary. For example, computer vision network 348 may visually inspect the bitmap image to determine whether it has features of malicious code, and even to classify it as belonging to a particular family of malware, according to the observed features. As discussed throughout this specification, computer vision network 348 may be trained (e.g., via pre-trained model 344, or via training sets) to identify both fully downloaded and partially downloaded binaries.

Figure 4:
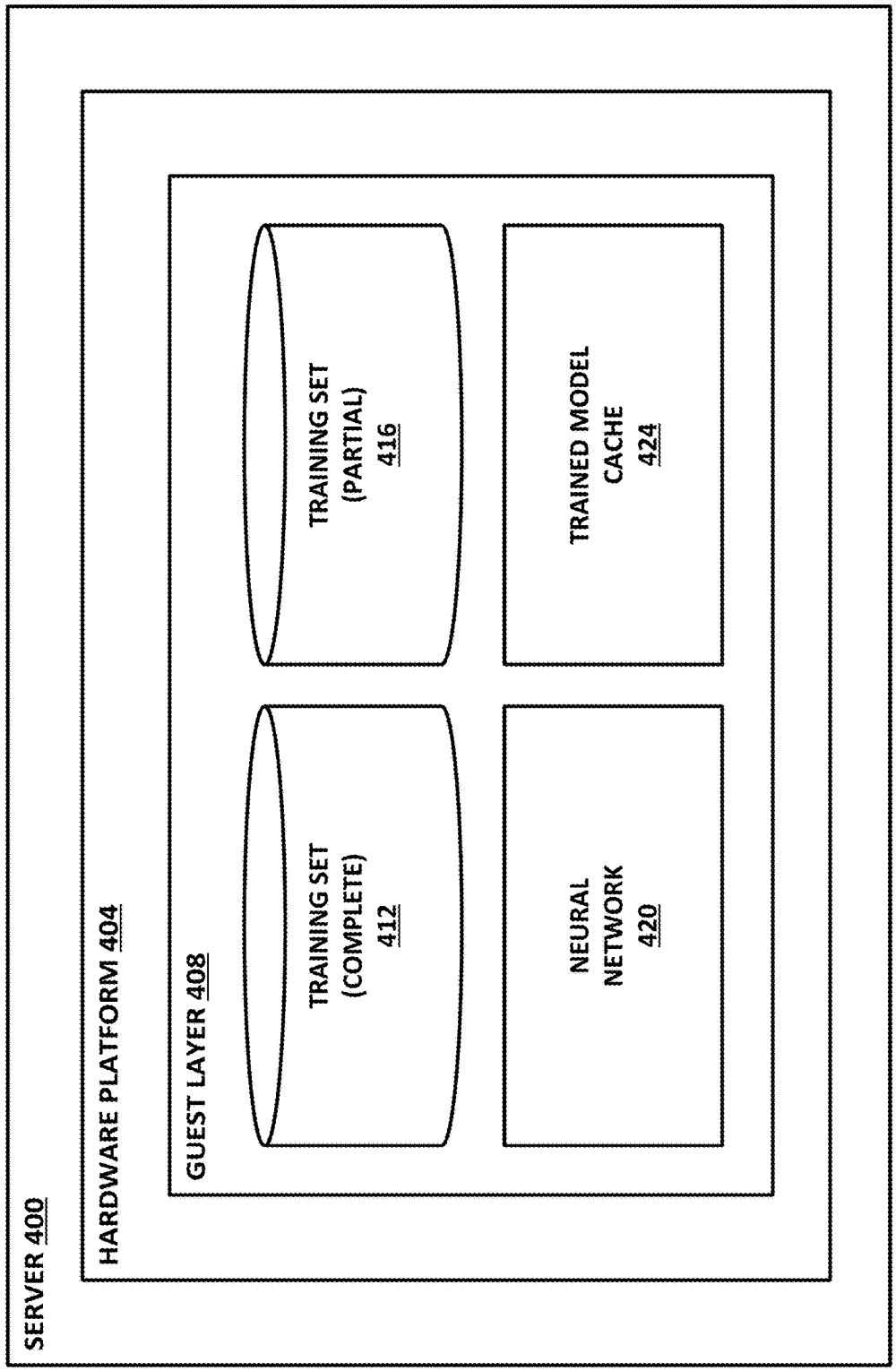
FIG. 4 is a block diagram of a server.

FIG. 4 is a block diagram of a server 400. Server 400 may be provided on a backend, and in some cases, may be more capable than the client device of FIG. 3. Server 400 may provide at least some functions via virtualization and/or containerization.

Server 400 includes a hardware platform 404, which provides hardware such as a processor, memory, accelerators, GPU banks, and other hardware resources that may be useful for server 400 to carry out its functions.

Server 400 may also include a guest layer 408. In cases where containerization, virtualization, or some other guest infrastructure is used, guest layer 408 may provide the underlying services.

Server 400 also provides several logical modules. These include a training set of images of fully downloaded binaries 412, and a training set of images of partial binaries 416. Both of these training sets may be used to train neural network 420. As described above, complete training set 412 includes fully downloaded binaries, while partial training set 416 includes partially downloaded binaries.

The partially downloaded binaries may be any appropriate fraction of a binary such as, for example, some value between 70 and 95%. The ratio of partial data to complete data may depend on the embodiment, and may range between, for example, 70% to 30% in favor of complete training data, 60:40, 50:50, 40:60, or 30:70, by way of illustrative and nonlimiting example.

Neural network 420 is trained on both training sets to produce a trained model, which may be cached in trained model cache 424. Trained model cache 424 may include weights and biases that are used in the neural network to recognize features. Note that in some cases, various training sets may be used, such as training sets with different ratios of complete data to partial data, or training sets that are based on different fractions of a download. In those cases, several models may be stored in trained model cache 424.

Figure 5:
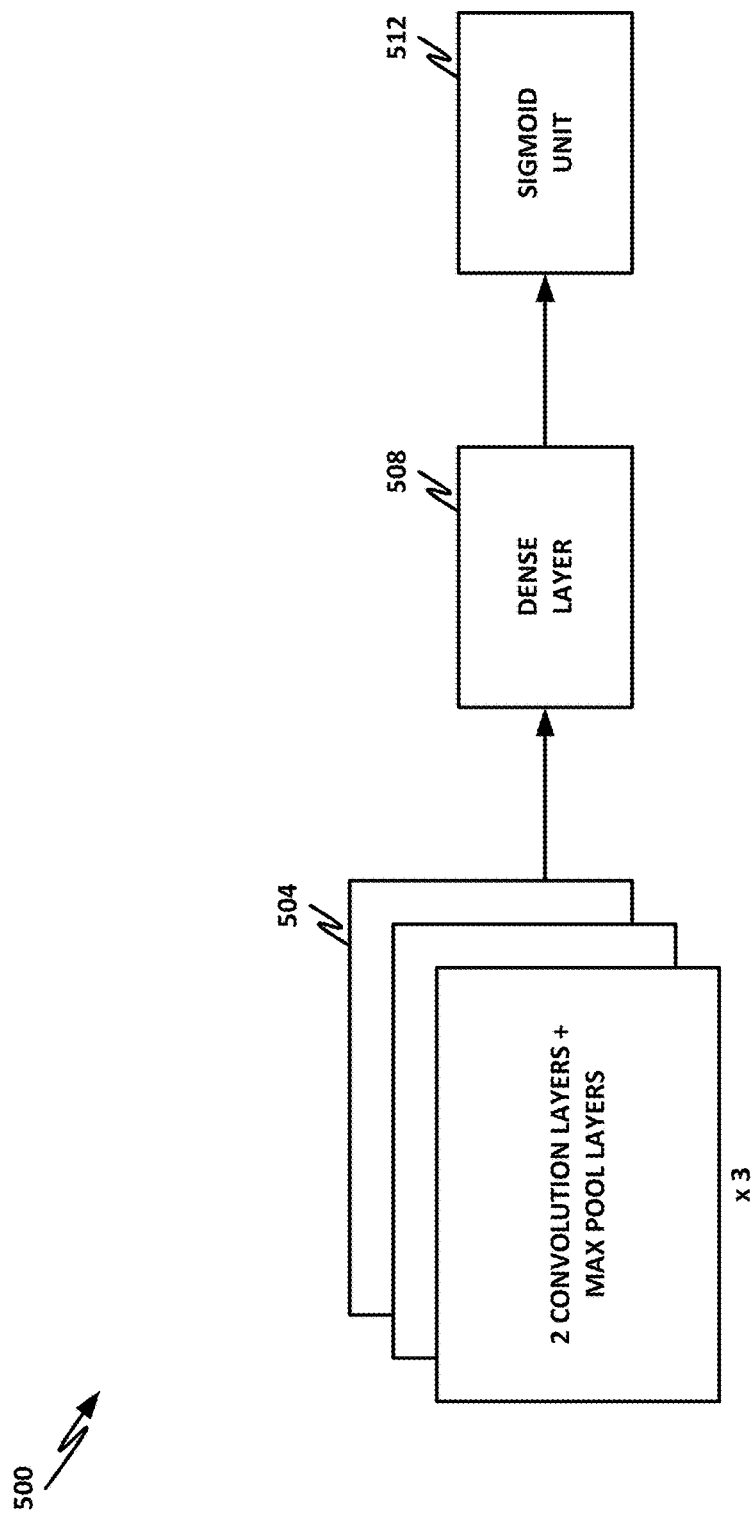
FIG. 5 is a block diagram illustrating a deep learning model architecture.

FIG. 5 is a block diagram illustrating a deep learning model architecture 500. Deep learning model architecture 500 may be used to provide the neural network of, for example, neural network 420 of FIG. 4, computer vision network 348 of FIG. 3, or any other appropriate network, according to the teachings of the present specification.

Block 504 illustrates an example of a CNN built with eight convolutional layers. This is a group of two convolutional layers, followed by a max pool layer, repeated three times. This feeds to a dense layer 508, which provides the activation function, such as a sigmoid or a rectified linear unit (ReLU) function. Control then flows to sigmoid unit 512, which performs the final classification, classifying the object as malicious or benign.

In an illustrative example, this architecture was used experimentally to validate that the training approach described herein makes the deep learning model more robust in predicting malware using partially downloaded files.

Experimentally, two models were trained, with one using only complete images generated from fully downloaded files with augmentation. The second model was trained both on complete images and on partial images generated from partially downloaded files at approximately 90% complete, with augmentation. In this example, augmentation with replacement was used.

The two trained deep learning models were tested on two sets of data. In the first set, test data consisting of complete images of fully downloaded files were used. In the second test set, the same samples were used with approximately a 90% partial download. In this example, approximately 45% of the randomly selected training images were replaced with a corresponding partial image. The result was that the model trained with 45% partial images performed better than the model trained only on full images.

Specifically, the models were tested on 3,806 executables with complete images and partial images, with the partial images including 10% missing data. These included both serially downloaded images (e.g., where the 10% missing data were from the end of the image), and randomly downloaded images (where the 10% missing data were interspersed throughout the image).

In this case, the model trained with augmented data performed better than the model trained only on full images. Table 1 below illustrates results based on analysis of complete images of executable files, while Table 2 below illustrates results based on analysis of partial images of executable files.

TABLE 1

Performance on Complete Images of Executable

|  | Benign | Malware | Benign | Malware |
|---|---|---|---|---|
| Benign | 1852 | 154 | 1870 | 136 |
| Malware | 212 | 1588 | 191 | 1609 |
|  | Without Augmentation | | With Augmentation | |
|  | Accuracy:90.38% | | Accuracy:91.40% | |

TABLE 2

Performance on Partial Images of Executable (10% Missing Data)

|  | Benign | Malware | Benign | Malware |
|---|---|---|---|---|
| Benign | 1789 | 217 | 1857 | 149 |
| Malware | 336 | 1464 | 187 | 1613 |
|  | Without Augmentation | | With Augmentation | |
|  | Accuracy: 85.47% | | Accuracy:91.17% | |

Figure 6:
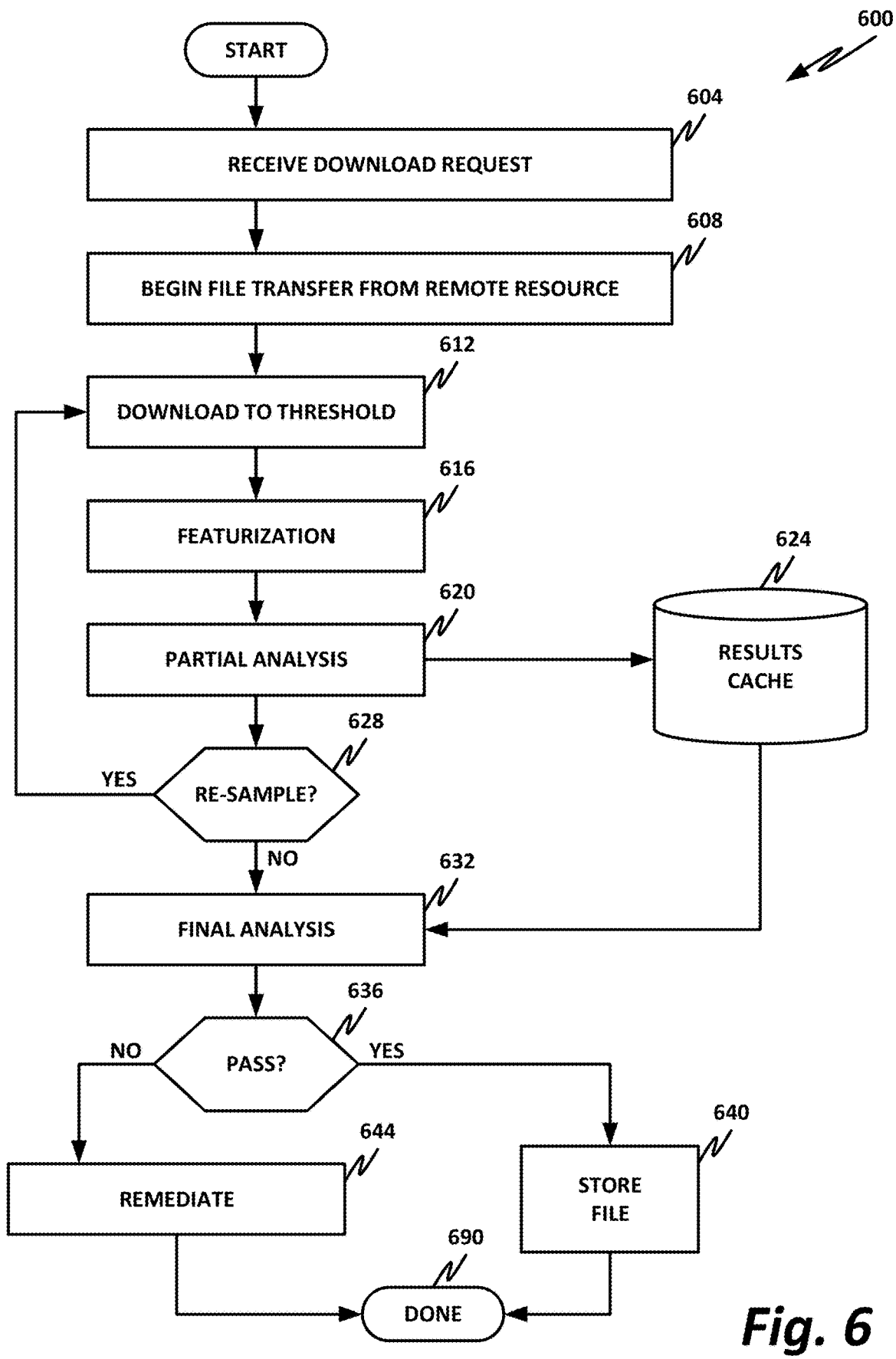
FIG. 6 is a flowchart of a method of performing analysis on a download.

FIG. 6 is a flowchart of a method 600 of performing analysis on a download. While downloads are used in this example as an illustrative example, the method could also be used on any file, and in particular, any case where a partial file may be available.

In block 604, the system receives a download request to download a file from a remote source.

In block 608, the system begins transferring the file from the remote source.

In block 612, the system downloads the file up to a particular threshold. For example, the threshold may be selected at approximately 70% or more.

In block 616, featurization occurs, in which the object is converted, for example, into a square grayscale image.

In block 620, the image is subjected to partial analysis, meaning analysis of a part of the file downloaded. The results are cached in results cache 624.

In decision block 628, the system decides whether a resample is required. For example, if the results do not have sufficient confidence, then it may be necessary to download more of the file to reach a higher confidence. This can be an iterative process where, for example, the file is checked at increments of 5 or 10% to determine whether a high confidence classification can be made. Thus, iterative checks could occur at 70, 80, and 90%, or at 75, 80, 85, 90, and 95%, or at other intervals as appropriate to the implementation.

If a resample is required, for example, because a high confidence result was not obtained, then control passes back to block 612, and a new analysis occurs.

Returning to decision block 628, if a resample is not required, then in block 632, the final analysis results are retrieved from results cache 624. In decision block 636, the system determines whether the object passed the final analysis.

In block 644, if the object did not pass the final analysis, then a remediation may occur. For example, the download may be rejected, or the object may be subjected to additional analysis, quarantine, sandboxing, or other security measures.

Returning to decision block 636, if the object does pass analysis, then in block 640, the downloaded object is stored or forwarded to the endpoint from the gateway.

In block 690, the method is done.

Figure 7:
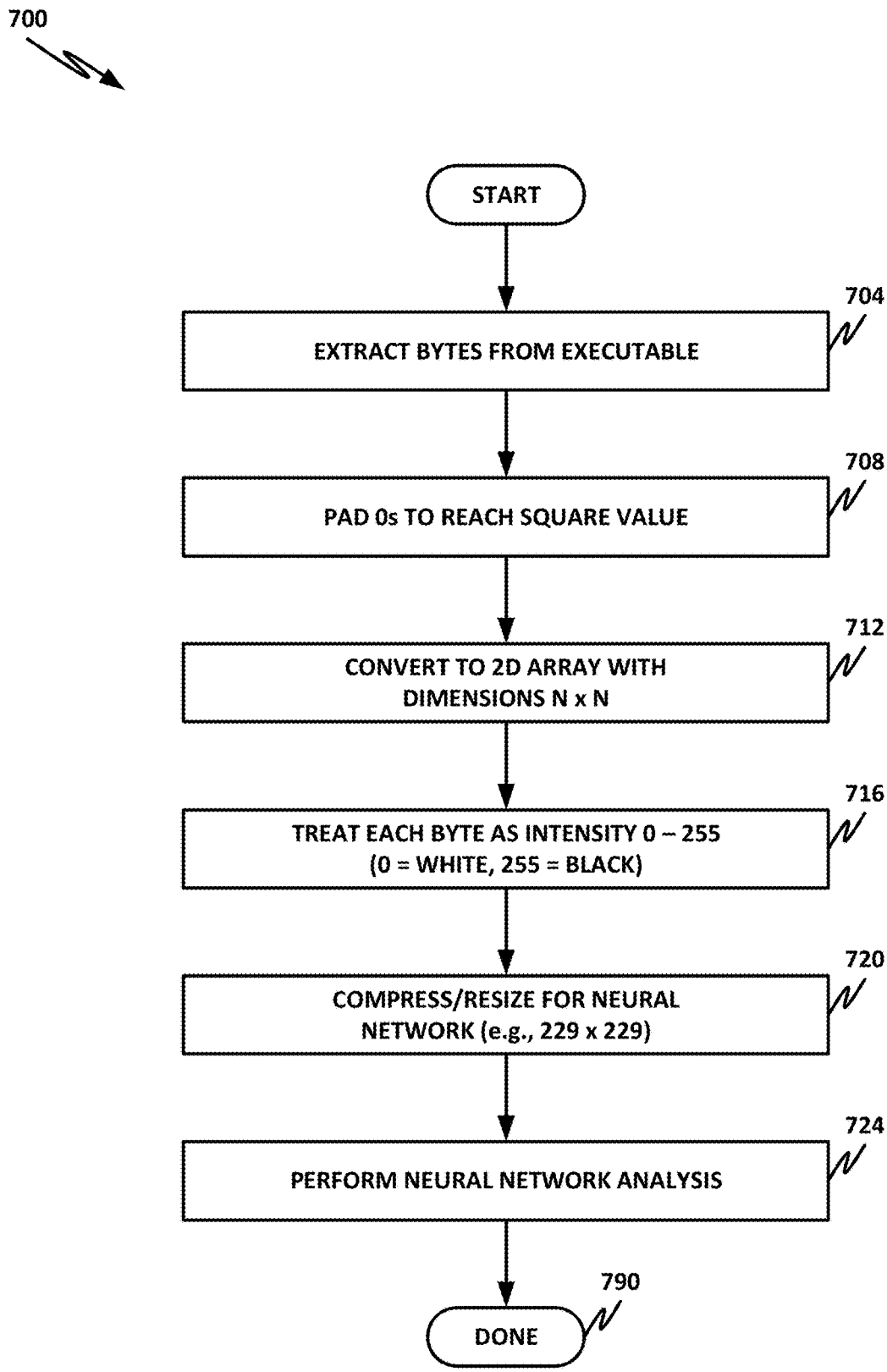
FIG. 7 is a flowchart of an additional method.

FIG. 7 is a flowchart of a method 700, indicating in more detail an analysis phase, such as the analysis of block 620 of FIG. 6, or any of the other analyses as shown in the present specification.

In block 704, the system extracts the available bytes from the executable file, including from the partial download.

In block 708, the system determines whether there is a square value, or whether additional padding is required. If additional padding is required to reach a square value, then the file may be padded with zeros to reach the desired square value.

In block 712, the bytes are converted into a two-dimensional (2D) array of N×N bytes. This 2D array of bytes can be visualized as a 2D grayscale image, with each byte value corresponding to a pixel with an intensity ranging from 0 to 255, as illustrated in block 716.

In block 720, the image may be compressed or resized as necessary for the neural network, such as by converting it to a known size that corresponds to the number of neurons in the input layer of the neural network. In this example, the image is resized to a 229×229-pixel grayscale image for analysis.

In block 724, the neural network performs the analysis, and classifies the object as malicious or benign, including with an appropriate confidence.

In block 790, the method is done.

Figure 8:
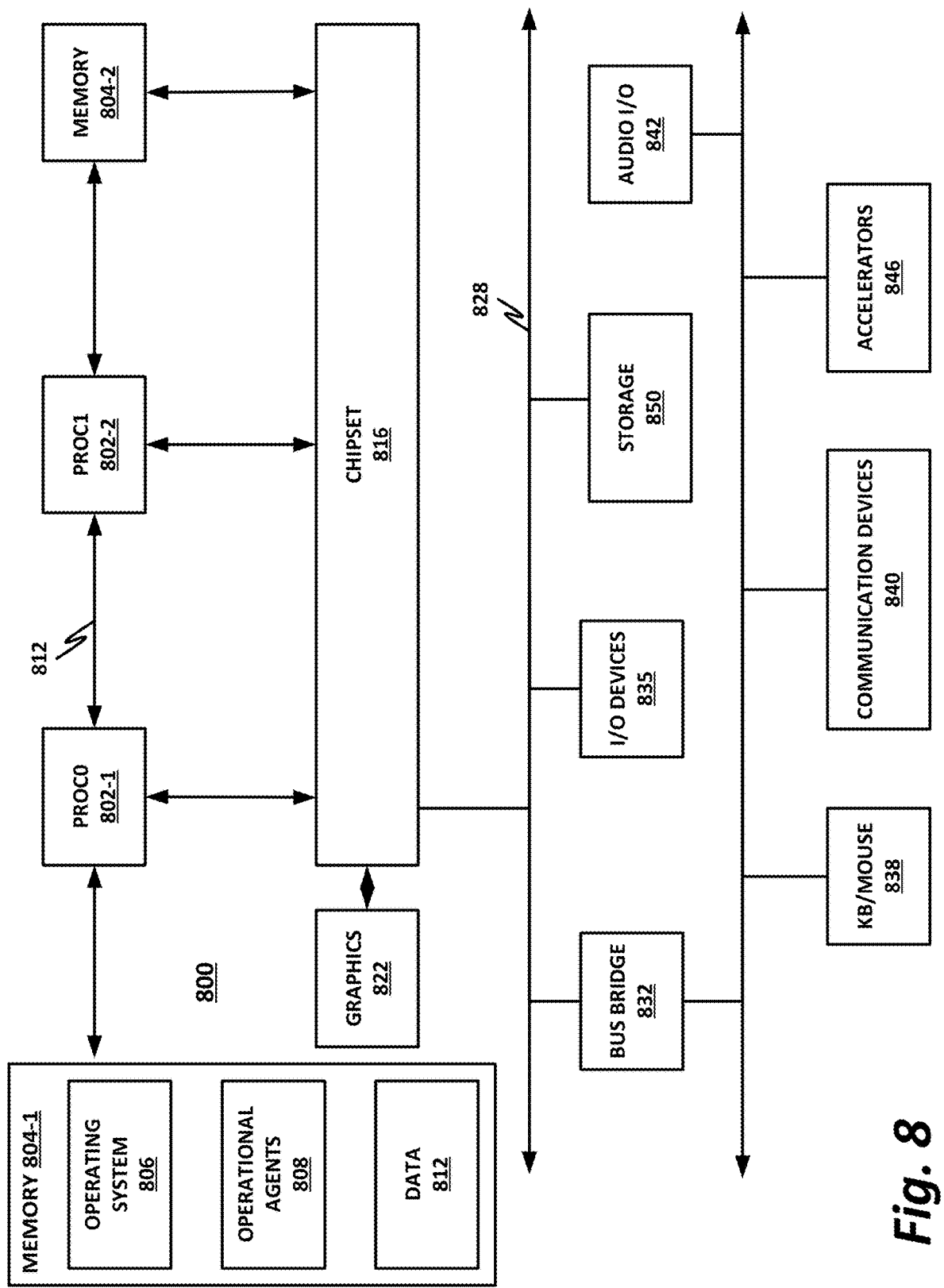
FIG. 8 is a block diagram of selected elements of a hardware platform.

FIG. 8 is a block diagram of a hardware platform 800. In at least some embodiments, hardware platform 800 may be programmed, configured, or otherwise adapted to provide scanning of partial downloads, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
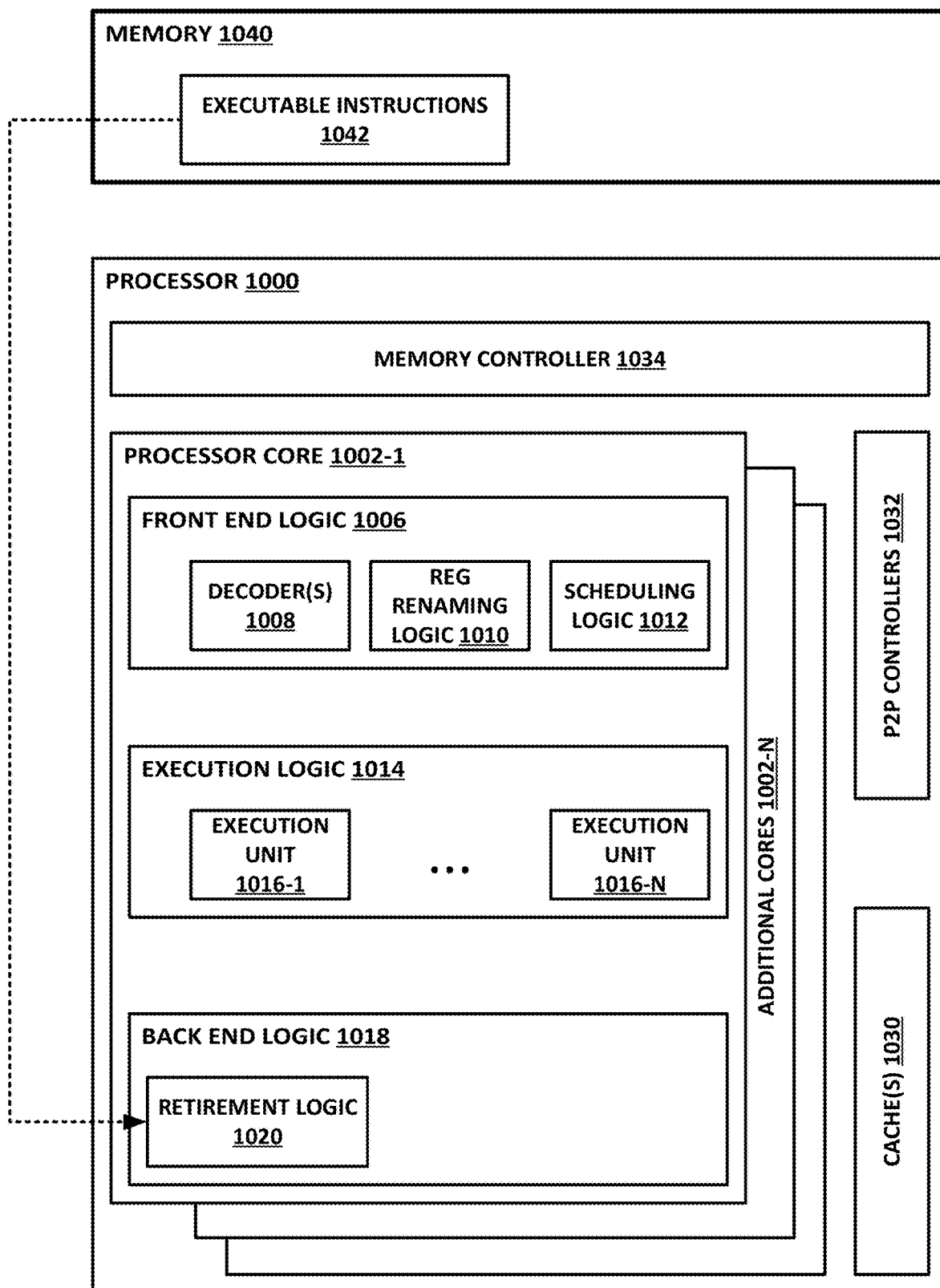
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own GPU.

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
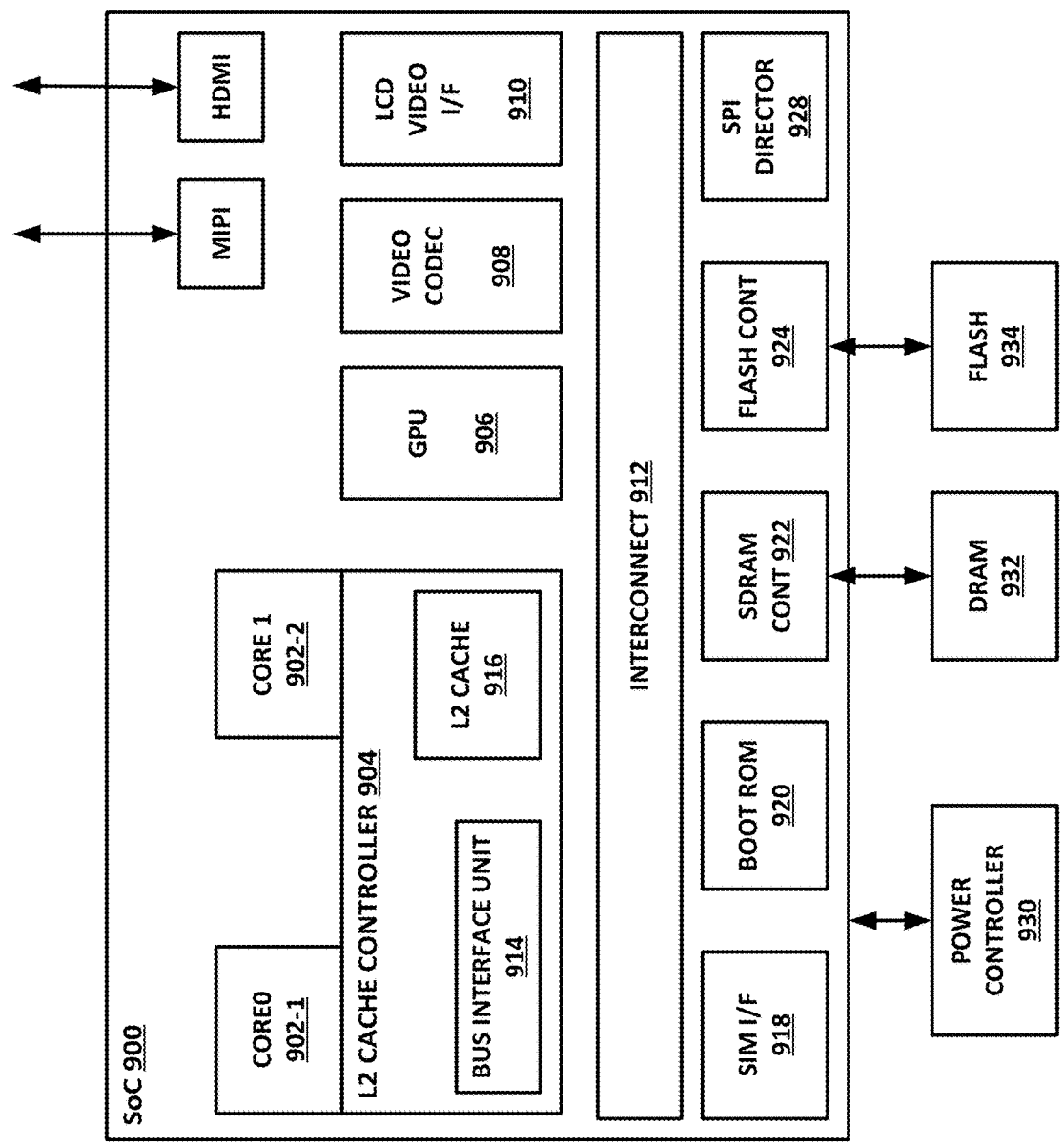
FIG. 9 is a block diagram of selected elements of a system-on-a-chip (SoC).

FIG. 9 is a block illustrating selected elements of an example SoC 900. In at least some embodiments, SoC 900 may be programmed, configured, or otherwise adapted to provide scanning of partial downloads, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) director 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be programmed, configured, or otherwise adapted to provide scanning of partial downloads, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and nonvolatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

FIG. 11 is a block diagram of a network function virtualization (NFV) infrastructure 1100. FIG. 11 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun-up") or removed ("spun down") to meet network demands. For example, in times of high load, more load balancing VNFs may be spun-up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., a fabric interface). This fabric interface may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
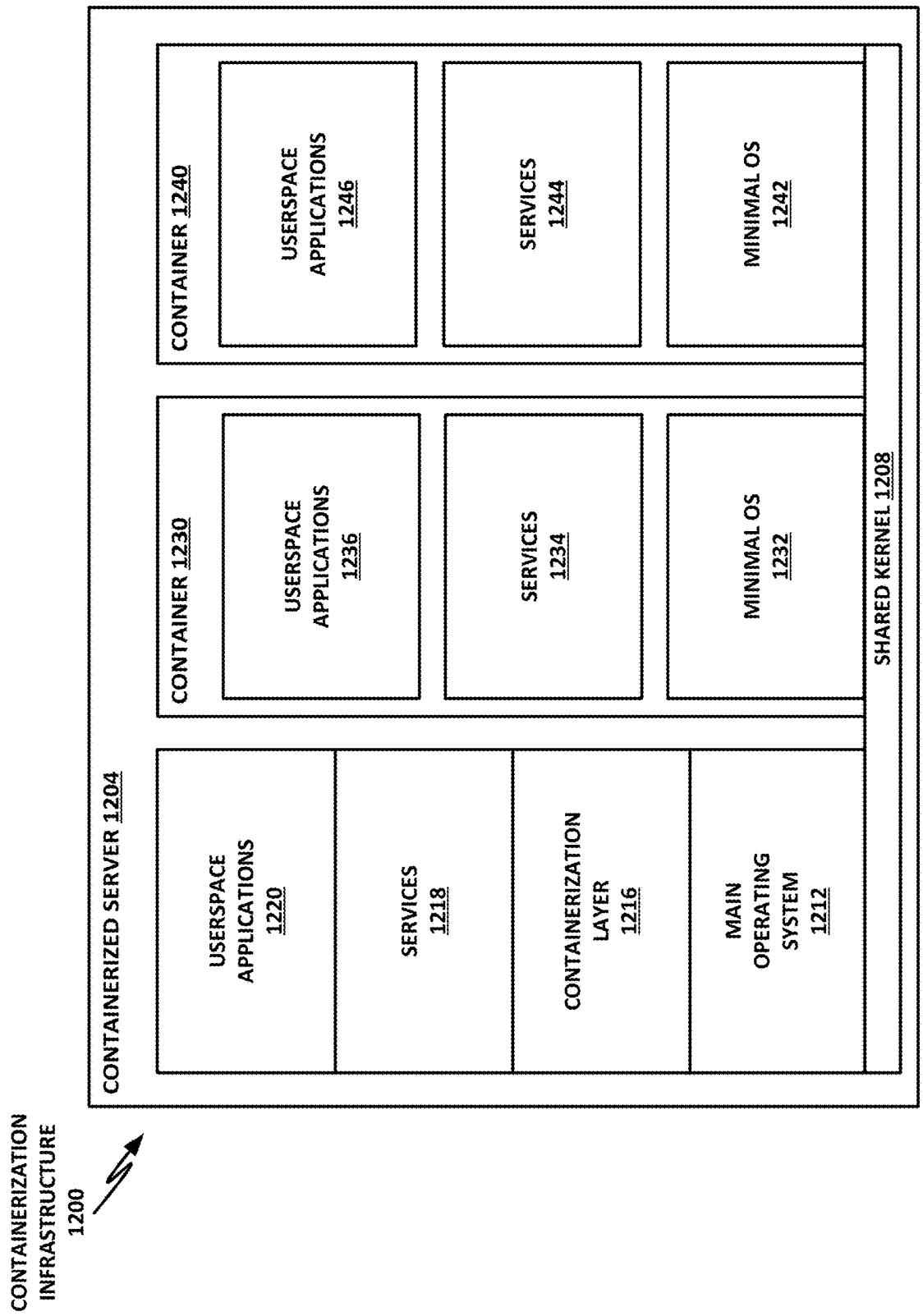
FIG. 12 is a block diagram of selected elements of a containerization infrastructure.

FIG. 12 is a block diagram of selected elements of a containerization infrastructure 1200. FIG. 12 illustrates a platform for providing containerization services. Containerization may be used in some embodiments to provide one or more features of the present disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 13:
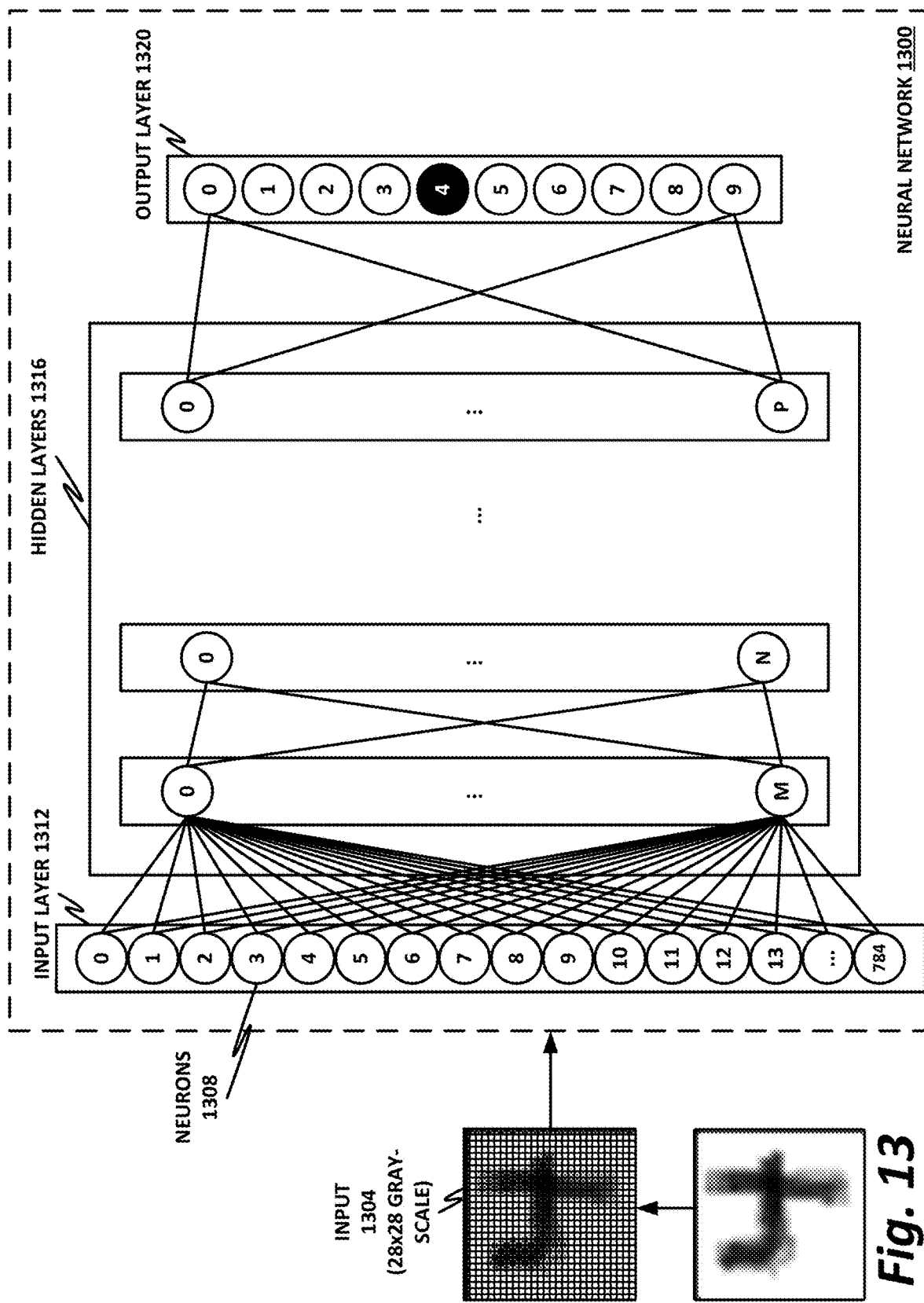
FIG. 13 illustrates machine learning according to a "textbook" problem with real-world applications.
Figure 14:
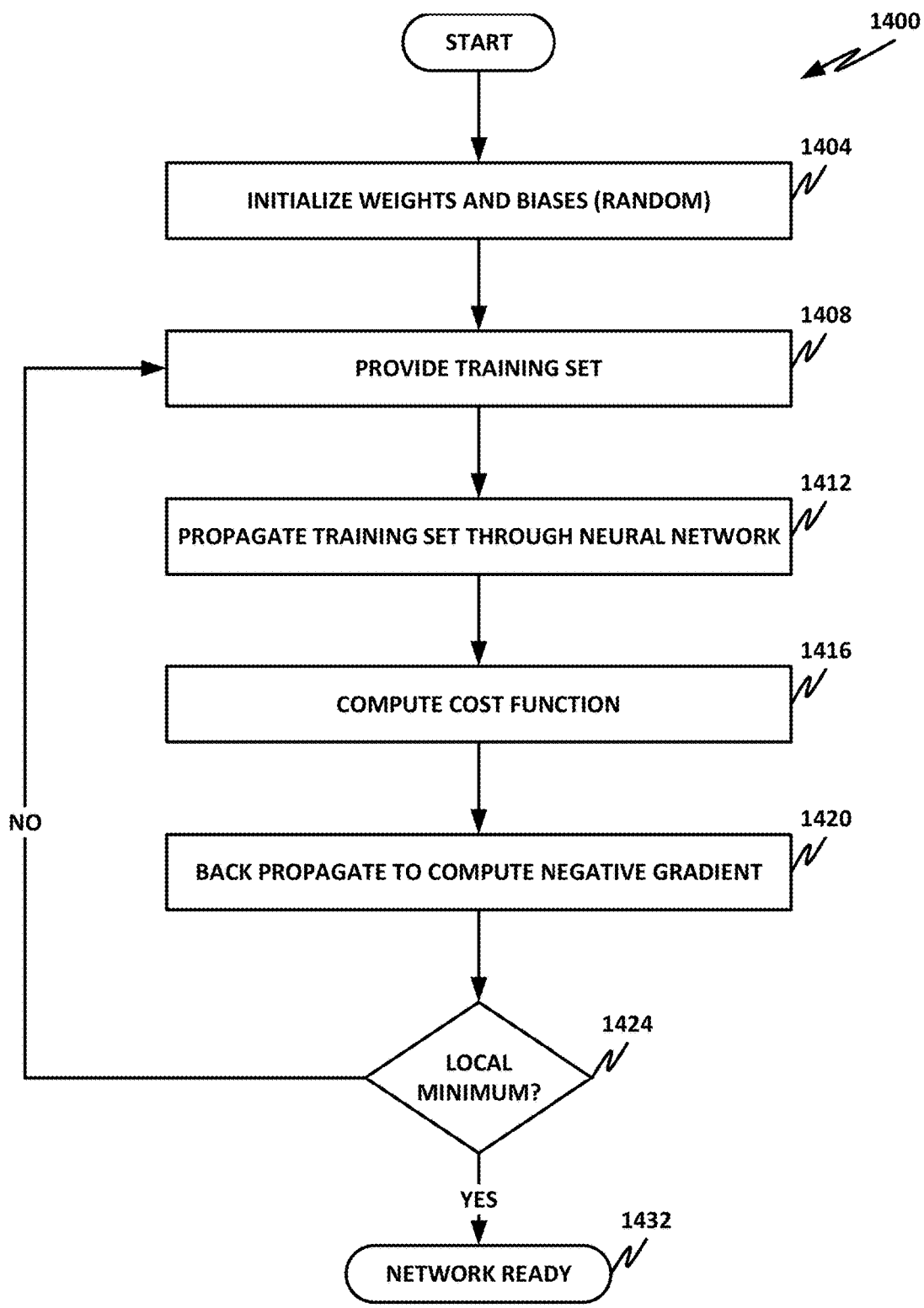
FIG. 14 is a flowchart of a method that may be used to train a neural network.
Figure 15:
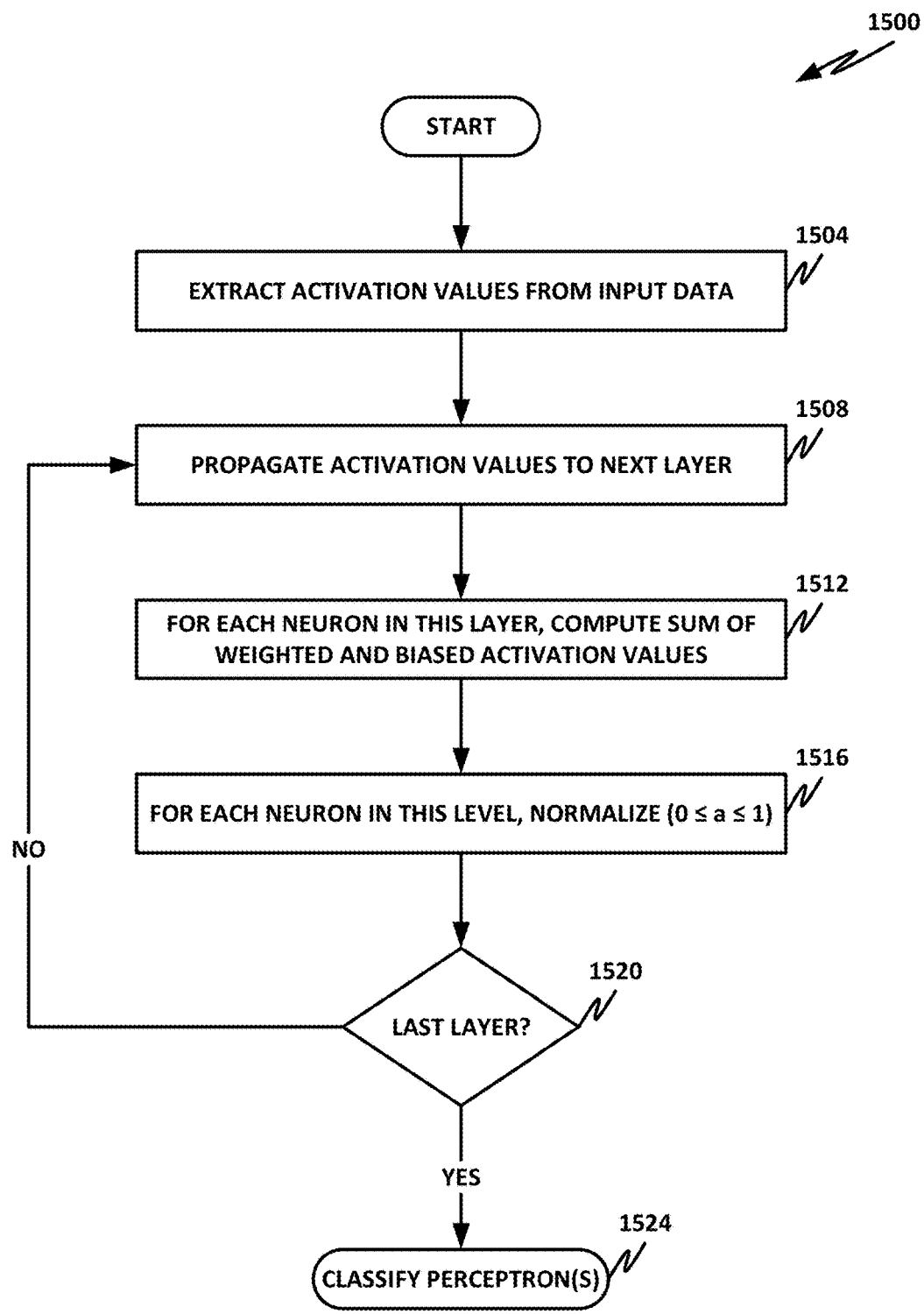
FIG. 15 is a flowchart of a method of using a neural network to classify an object.

FIGS. 13-15 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 13 illustrates machine learning according to a "textbook" problem with real-world applications. In this case, a neural network 1300 is tasked with recognizing characters.

To simplify the description, neural network 1300 is tasked only with recognizing single digits in the range of 0 through 9. These are provided as an input image 1304. In this example, input image 1304 is a 28×28-pixel 8-bit grayscale image. In other words, input image 1304 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1300 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1300 includes an input layer 1312 and an output layer 1320. In principle, input layer 1312 receives an input such as input image 1304, and at output layer 1320, neural network 1300 "lights up" a perceptron that indicates which character neural network 1300 thinks is represented by input image 1304.

Between input layer 1312 and output layer 1320 are some number of hidden layers 1316. The number of hidden layers 1316 will depend on the problem to be solved, the available compute resources, and other design factors. In general, the more hidden layers 1316, and the more neurons per hidden layer, the more accurate the neural network 1300 may become. However, adding hidden layers and neurons also increases the complexity of the neural network, and its demand on compute resources. Thus, some design skill is required to determine the appropriate number of hidden layers 1316, and how many neurons are to be represented in each hidden layer 1316.

Input layer 1312 includes, in this example, 784 "neurons" 1308. Each neuron of input layer 1312 receives information from a single pixel of input image 1304. Because input image 1304 is a 28×28 grayscale image, it has 784 pixels. Thus, each neuron in input layer 1312 holds 8 bits of information, taken from a pixel of input layer 1304. This 8-bit value is the "activation" value for that neuron.

Each neuron in input layer 1312 has a connection to each neuron in the first hidden layer in the network. In this example, the first hidden layer has neurons labeled 0 through M. Each of the M+1 neurons is connected to all 784 neurons in input layer 1312. Each neuron in hidden layer 1316 includes a kernel or transfer function, which is described in greater detail below. The kernel or transfer function determines how much "weight" to assign each connection from input layer 1312. In other words, a neuron in hidden layer 1316 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1316, until they reach the last layer, which has P+1 neurons labeled 0 through P. Each of these P+1 neurons has a connection to each neuron in output layer 1320. Output layer 1320 includes a number of neurons known as perceptrons that compute an activation value based on their weighted connections to each neuron in the last hidden layer 1316. The final activation value computed at output layer 1320 may be thought of as a "probability" that input image 1304 is the value represented by the perceptron. For example, if neural network 1300 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1316 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular ReLU function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1312) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left( \begin{bmatrix} w_{0,0} & \ldots & w_{0,n} \\ \vdots & \ddots & \vdots \\ w_{(k,0)} & \ldots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix} \right) \quad (1)$$

More compactly, the full transfer function for layer 1 can be written in vector notation as:

$$a^{(1)} = \sigma(W a^{(0)} + b)$$

Neural connections and activation values are propagated throughout the hidden layers 1316 of the network in this way, until the network reaches output layer 1320. At output layer 1320, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1320 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw} = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 14 is a flowchart of a method 1400. Method 1400 may be used to train a neural network, such as neural network 1300 of FIG. 13.

In block 1404, the network is initialized. Initially, neural network 1300 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1408, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1408, the initial training set is provided to the neural network. Alternatively, the full training set could be used in each iteration.

In block 1412, the training data are propagated through the neural network. Because the initial values are random, and are therefore essentially garbage, it is expected that the output will also be a garbage value. In other words, if neural network 1300 of FIG. 13 has not been trained, when input image 1304 is fed into the neural network, it is not expected with the first training set that output layer 1320 will light up perceptron 4. Rather, the perceptrons may have values that are all over the map, with no clear winner, and with very little relation to the number 4.

In block 1416, a cost function is computed as described above. For example, in neural network 1300, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1420, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1424, the system determines whether it has reached a local minimum (e.g., whether the gradient has reached 0 within the threshold). If the local minimum has not been reached, then the neural network has not been adequately trained, and control returns to block 1408 with a new training set. The training sequence continues until, in block 1424, a local minimum has been reached.

Now that a local minimum has been reached and the corrections have been back-propagated, in block 1432, the neural network is ready.

FIG. 15 is a flowchart of a method 1500. Method 1500 illustrates a method of using a neural network, such as network 1300 of FIG. 13, to classify an object.

In block 1504, the network extracts the activation values from the input data. For example, in the example of FIG. 13, each pixel in input image 1304 is assigned as an activation value to a neuron 1308 in input layer 1312.

In block 1508, the network propagates the activation values from the current layer to the next layer in the neural network. For example, after activation values have been extracted from the input image, those values may be propagated to the first hidden layer of the network.

In block 1512, for each neuron in the current layer, the neuron computes a sum of weighted and biased activation values received from each neuron in the previous layer. For example, in the illustration of FIG. 13, neuron 0 of the first hidden layer is connected to each neuron in input layer 1312. A sum of weighted values is computed from those activation values, and a bias is applied.

In block 1516, for each neuron in the current layer, the network normalizes the activation values by applying a function such as sigmoid, ReLU, or some other function.

In decision block 1520, the network determines whether it has reached the last layer in the network. If this is not the last layer, then control passes back to block 1508, where the activation values in this layer are propagated to the next layer.

Returning to decision block 1520, If the network is at the last layer, then the neurons in this layer are perceptrons that provide final output values for the object. In terminal 1524, the perceptrons are classified and used as output values.

Figure 16:
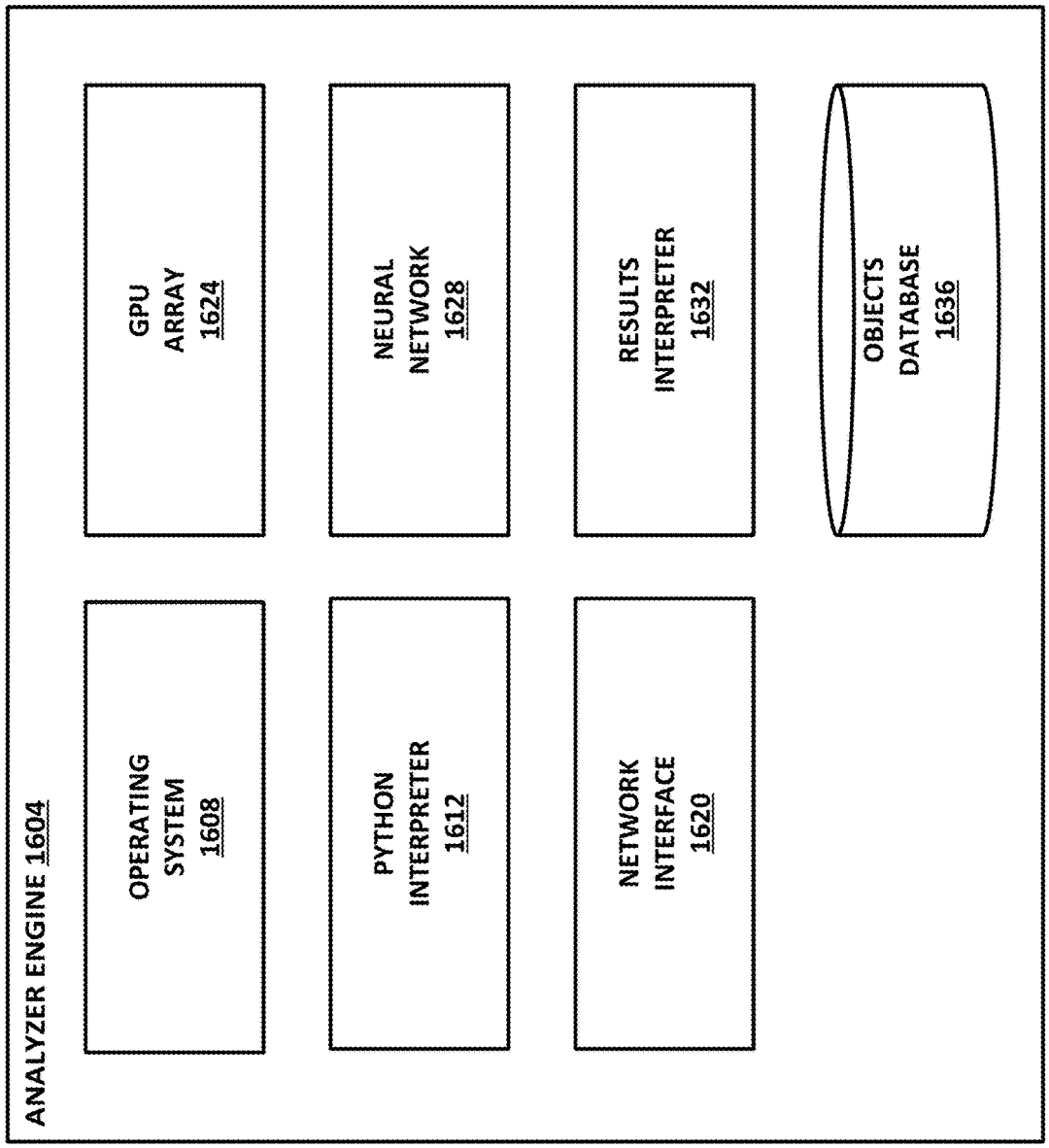
FIG. 16 is a block diagram illustrating selected elements of an analyzer engine.

FIG. 16 is a block diagram illustrating selected elements of an analyzer engine 1604. Analyzer engine 1604 may be configured to provide analysis services, such as via a neural network. FIG. 16 illustrates a platform for providing analysis services. Analysis, such as neural analysis and other machine learning models, may be used in some embodiments to provide one or more features of the present disclosure.

Note that analyzer engine 1604 is illustrated here as a single modular object, but in some cases, different aspects of analyzer engine 1604 could be provided by separate hardware, or by separate guests (e.g., virtual machines or containers) on a hardware system.

Analyzer engine 1604 includes an operating system 1608. Commonly, operating system 1608 is a Linux operating system, although other operating systems, such as Microsoft Windows, Mac OS X, or similar could be used. Analyzer engine 1604 also includes a Python interpreter 1612, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1624 may include an array of graphics processing units that may be used to carry out the neural network functions of neural network 1628. Note that GPU arrays are a popular choice for this kind of processing, but neural networks can also be implemented in CPUs, or in ASICs or FPGAs that are specially designed to implement the neural network.

Neural network 1628 includes the actual code for carrying out the neural network, and as mentioned above, is commonly programmed in Python.

Results interpreter 1632 may include logic separate from the neural network functions that can be used to operate on the outputs of the neural network to assign the object for particular classification, perform additional analysis, and/or provide a recommended remedial action.

Objects database 1636 may include a database of known malware objects and their classifications. Neural network 1628 may initially be trained on objects within objects database 1636, and as new objects are identified, objects database 1636 may be updated with the results of additional neural network analysis.

Once final results have been obtained, the results may be sent to an appropriate destination via network interface 1620.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A hardware computing platform, comprising:
   a processor circuit;
   a memory;
   a network interface; and
   a security module, comprising instructions encoded within the memory to cause the processor circuit to:
   receive, via the network interface, a request to download a full file from the internet;
   download a first portion of the file into a buffer of the memory, wherein the first portion is less than the full file;
   pause the download, and while the download is paused, convert the first portion into an image and analyze the image using computer vision to determine whether the file is likely malware; and
   resume the download only if the file is determined to be not likely malware.

2. The hardware computing platform of claim 1, wherein the first portion is between 70% and 90% of the full file.

3. The hardware computing platform of claim 1, wherein the instructions are further to provision a machine learning engine, and wherein analyzing the first portion comprises operating the machine learning engine.

4. The hardware computing platform of claim 3, wherein the machine learning engine comprises a neural network.

5. The hardware computing platform of claim 4, wherein the neural network is configured and trained for computer vision analysis.

6. The hardware computing platform of claim 5, wherein the neural network is trained on partial downloads.

7. The hardware computing platform of claim 4, wherein the instructions are further to featurize the first portion before analyzing.

8. The hardware computing platform of claim 7, wherein featurizing comprises converting the first portion to an image.

9. The hardware computing platform of claim 8, wherein converting the first portion to an image comprises lossy compression.

10. The hardware computing platform of claim 8, wherein converting the first portion to an image comprises zero-padding the first portion to a square.

11. An endpoint device comprising the hardware computing platform of claim 1.

12. A network gateway device comprising the hardware computing platform of claim 1.

13. One or more tangible, non-transitory computer-readable media having stored thereon executable instructions to:
   partially download a file from an untrusted source;
   after partially downloading, pause the download;
   featurize the partially downloaded file;
   analyze the features for malware characteristics using computer vision to determine if the file is likely malware; and
   resume download of the file only if the file is not likely malware.

14. The one or more tangible, non-transitory computer-readable media of claim 13, wherein the instructions are further to hook a layer of a network stack.

15. The one or more tangible, non-transitory computer-readable media of claim 14, wherein the instructions are further to provide a shim application, and to insert the shim application into a network stack.

16. The one or more tangible, non-transitory computer-readable media of claim 14, wherein the instructions are further to download a second portion of the file and analyze the second portion of the file, wherein analyzing the features further comprises comparing the partially downloaded file with the second portion of the file.

17. The one or more tangible, non-transitory computer-readable media of claim 16, wherein the instructions are further to download a third portion of the file and analyze the third portion, wherein analyzing the features further comprises comparing the partially downloaded file with the second portion of the file and the third portion of the file.

18. A method of analyzing file downloads, comprising:
   training a computer vision system on a combination of complete and partial downloads;
   pausing downloading of the full file;
   while downloading of the full file is paused, operating the computer vision system to analyze the partially downloaded file;
   based on the analysis of the partially downloaded file, determining whether the full file is likely malware; and
   resuming downloading of the file only if the full file is not likely malware.

19. The method of claim 18, further comprising inserting a shim application into a network stack.

* * * * *

UNITED STATES PATENT AND TRADEMARK OFFICE
CERTIFICATE OF CORRECTION

| | | |
|---|---|---|
| PATENT NO. | : 11,847,220 B2 | Page 1 of 1 |
| APPLICATION NO. | : 17/168934 | |
| DATED | : December 19, 2023 | |
| INVENTOR(S) | : Abhishek Tripathi et al. | |

It is certified that error appears in the above-identified patent and that said Letters Patent is hereby corrected as shown below:

In the Claims

In Column 38, Claim 15, Line 55, delete "claim 14," and insert -- claim 13, --, therefor.

In Column 38, Claim 16, Line 59, delete "claim 14," and insert -- claim 13, --, therefor.

In Column 39, Claim 18, Line 5, delete "downloads;" and insert -- downloads; partially downloading a full file; --, therefor.

Signed and Sealed this
Sixteenth Day of April, 2024

*Katherine Kelly Vidal*

Katherine Kelly Vidal
*Director of the United States Patent and Trademark Office*